US012811446B2

(12) United States Patent
Long et al.

(10) Patent No.: US 12,811,446 B2
(45) Date of Patent: Nov. 24, 2026

(54) AXIAL FLUX ELECTRIC MACHINE

(71) Applicant: DEERE & COMPANY, Moline, IL (US)

(72) Inventors: Randall L. Long, Coffeyville, KS (US); Stacy K. Worley, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 323 days.

(21) Appl. No.: 18/740,744

(22) Filed: Jun. 12, 2024

(65) Prior Publication Data

US 2025/0385554 A1 Dec. 18, 2025

(51) Int. Cl.

*H02K 1/20* (2006.01)
*H02K 1/2793* (2022.01)
*H02K 3/24* (2006.01)
*H02K 9/193* (2006.01)

(52) U.S. Cl.

CPC ............ *H02K 1/20* (2013.01); *H02K 1/2793* (2013.01); *H02K 3/24* (2013.01); *H02K 9/193* (2013.01)

(58) Field of Classification Search

CPC .. H02K 1/2793; H02K 1/2795; H02K 1/2796; H02K 1/2798; H02K 9/19; H02K 9/193; H02K 9/197

See application file for complete search history.

(56) References Cited

U.S. PATENT DOCUMENTS

| | | | | |
|---|---|---|---|---|
| 8,558,425 B2 | 10/2013 | Stahlhut et al. | | |
| 2008/0042515 A1* | 2/2008 | Butterfield | H02K 1/2795 | 310/156.36 |
| 2013/0062884 A1* | 3/2013 | Bonomi | F03D 80/70 | 310/156.01 |
| 2024/0322616 A1* | 9/2024 | Dominik | H02K 1/04 | |

FOREIGN PATENT DOCUMENTS

| | | | |
|---|---|---|---|
| EP | 4084288 A1 * | 11/2022 | H02K 9/19 |
| WO | WO-2009025076 A1 * | 2/2009 | F16C 39/06 |

OTHER PUBLICATIONS

Suzuki (WO 2009025076 A1) English Translation. (Year: 2009).*

* cited by examiner

*Primary Examiner* — Tulsidas C Patel
*Assistant Examiner* — Robert E Mates

(57) ABSTRACT

An axial flux electric machine includes a housing, a rotor rotatably mounted to the housing for rotation relative to the housing, and a stator fixed with the housing and axially spaced from the rotor by an air gap to allow rotation of the rotor relative to the stator and the housing. The stator includes a winding layer and a fluid channel layer. The winding layer has a first winding layer side and a second winding layer side. The winding layer includes windings configured to carry electrical current. The fluid channel layer extends radially in the housing and has a fluid channel configured to circulate a fluid against the plurality of windings.

18 Claims, 4 Drawing Sheets

AXIAL FLUX ELECTRIC MACHINE

BACKGROUND

An axial flux electric machine is a type of electric machine where magnetic flux may flow parallel to the axis of rotation of the electric machine. Axial flux electric machines may be used in various applications such as in battery electric and hybrid vehicles and industrial machinery due to the compact size, high efficiency, and power density of axial flux electric machines. A relatively short axial length and/or a relatively low overall space requirement of axial flux electric machines may be advantageous for use in or with wheel drives of a battery electric or hybrid vehicle in one particular non-limiting example.

SUMMARY

In accordance with aspects of the present disclosure, an axial flux electric machine is provided. The axial flux electric machine includes a housing, a rotor rotatably mounted to the housing for rotation relative to the housing, the rotor comprising a rotor disc comprising a plurality of magnets fixed to the rotor disc, and a stator fixed with the housing and axially spaced from the rotor by an air gap to allow rotation of the rotor relative to the stator and the housing. The stator includes a winding layer extending radially in the housing and comprising a first winding layer side and a second winding layer side opposite from the first winding layer side such that the air gap is disposed at the first winding layer side, the winding layer further comprising a plurality of windings configured to carry electrical current, and a fluid channel layer extending radially in the housing and being disposed at the second winding layer side opposite from the first winding layer side and comprising a fluid channel configured to circulate a fluid against the plurality of windings.

The second winding layer side of the fluid channel layer may form an inner axial side of the fluid channel of the fluid channel layer. The fluid channel may include a serpentine path configured to circulate the fluid at least one of radially and circumferentially through the fluid channel. The fluid channel may include at least one inlet configured to circulate the fluid into the fluid channel at an inlet location of the fluid channel layer and at least one outlet configured to circulate the fluid out of the fluid channel at an outlet location of the fluid channel layer that is circumferentially spaced from the inlet location at a radially outer edge of the fluid channel layer. The inlet location may be circumferentially spaced from the outlet location by an angle greater than zero degrees and less than 180 degrees. The fluid channel may include two inlets configured to circulate the fluid into the fluid channel at a first inlet location of the fluid channel layer and a second inlet location of the fluid channel layer and two outlets configured to circulate the fluid out of the fluid channel at a first outlet location at the fluid channel layer and a second outlet location of the fluid channel layer, wherein each of the first inlet location, second inlet location, first outlet location, and second outlet location may be circumferentially spaced at a radially outer edge of the fluid channel layer. The first inlet location, the second inlet location, the first outlet location, and the second outlet location may be evenly and circumferentially spaced at the radially outer edge of the fluid channel layer. The winding layer may include a plurality of winding layer laminations stacked axially and each comprising the plurality of windings. The fluid channel layer may include a plurality of fluid channel layer laminations stacked axially and cooperating to form the fluid channel to circulate the fluid.

In accordance with aspects of the present disclosure, an axial flux electric machine is provided. The axial flux electric machine includes a housing, a rotor rotatably mounted to the housing for rotation relative to the housing, the rotor comprising a plurality of rotor discs, each of the plurality of rotor discs comprising a plurality of magnets fixed to the rotor disc, and a stator fixed with the housing and comprising a plurality of stator portions, each of the plurality of stator portions axially spaced from at least one of the plurality of rotor discs of the rotor by an air gap to allow rotation of the rotor relative to the stator and the housing. At least one of the plurality of stator portions comprises at least one winding layer extending radially in the housing and comprising a first winding layer side and a second winding layer side opposite from the first winding layer side such that the air gap is disposed at the first winding layer side, the winding layer further comprising a plurality of windings configured to carry electrical current; and a fluid channel layer extending radially in the housing and being disposed at the second winding layer side opposite from the first winding layer side and comprising a fluid channel configured to circulate a fluid against the plurality of windings.

The at least one winding layer may include two winding layers extending radially in the housing and disposed axially between two of the plurality of rotor discs of the rotor with the fluid channel layer disposed between the two winding layers. The second winding layer side of each of the two winding layers may form a first inner axial side of the fluid channel and a second inner axial side of the fluid channel. The second winding layer side of the fluid channel layer may form an inner axial side of the fluid channel. The fluid channel may include a serpentine path configured to circulate the fluid at least one of radially and circumferentially through the fluid channel. The fluid channel may include at least one inlet configured to circulate the fluid into the fluid channel at an inlet location of the fluid channel layer and at least one outlet configured to circulate the fluid out of the fluid channel at an outlet location of the fluid channel layer that is circumferentially spaced from the inlet location at a radially outer edge of the fluid channel layer. The inlet location may be circumferentially spaced from the outlet location by an angle greater than zero degrees and less than 180 degrees. The fluid channel may include two inlets configured to circulate the fluid into the fluid channel at a first inlet location of the fluid channel layer and a second inlet location of the fluid channel layer and two outlets configured to circulate the fluid out of the fluid channel at a first outlet location at the fluid channel layer and a second outlet location of the fluid channel layer, wherein each of the first inlet location, second inlet location, first outlet location, and second outlet location may be circumferentially spaced at a radially outer edge of the fluid channel layer. The first inlet location, the second inlet location, the first outlet location, and the second outlet location may be evenly and circumferentially spaced at the radially outer edge of the fluid channel layer. The winding layer may include a plurality of winding layer laminations stacked axially and each may comprise the plurality of windings. The fluid channel layer may comprise a plurality of fluid channel layer laminations stacked axially and cooperating to form the fluid channel to circulate the fluid.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Figure 1:
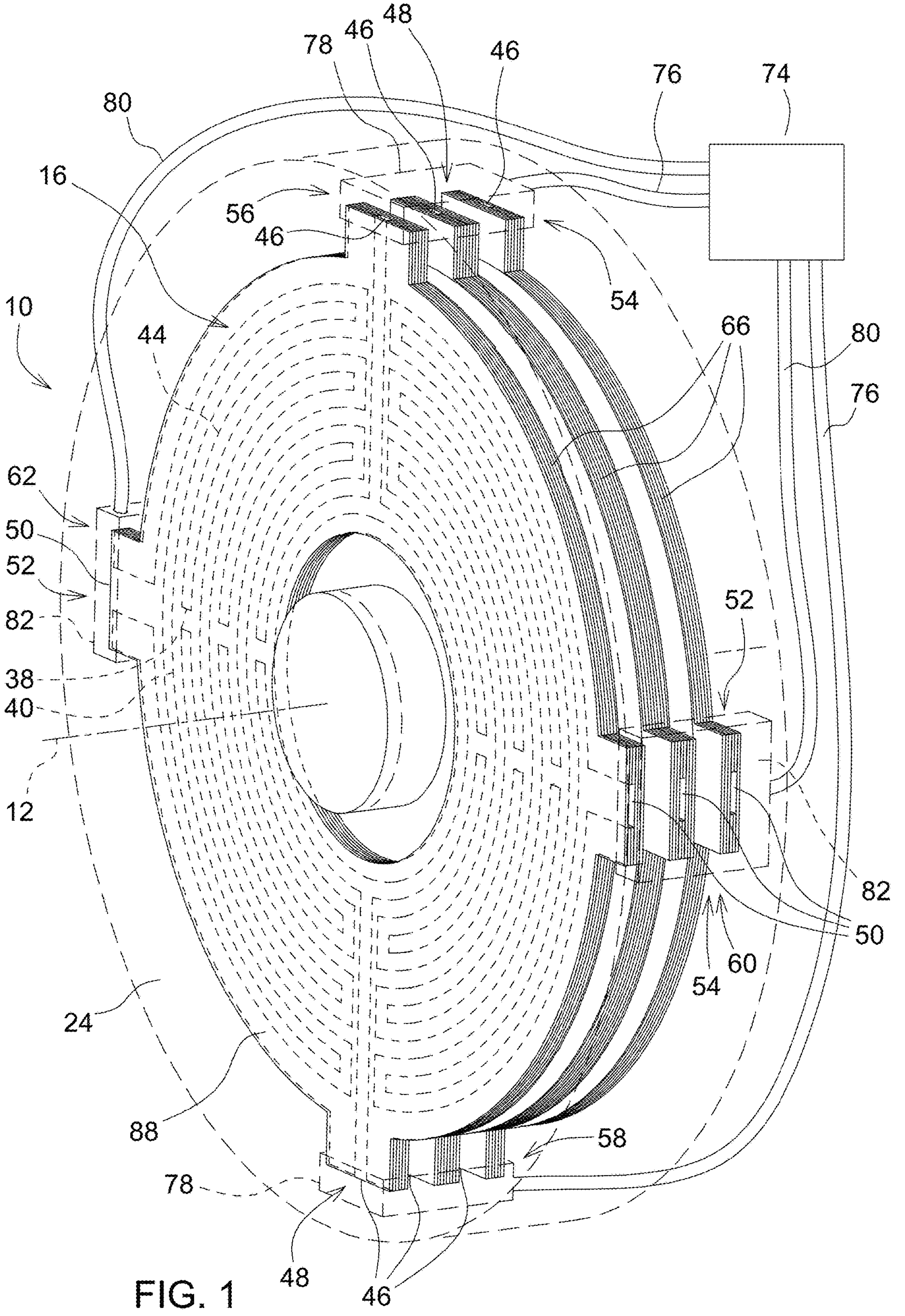
FIG. 1 illustrates an axial flux electric machine in accordance with an embodiment of the present disclosure.

Referring to FIGS. 1-4, an electric machine 10 in accordance with one or more embodiments of the present disclosure is illustrated. The electric machine 10 shown in FIG. 1 is an axial flux electric machine, which is a type of electric machine that uses magnets and/or magnetic elements to create magnetic fields such that magnetic flux flows parallel to a rotational axis 12 of the electric machine 10. The electric machine 10 of one or more additional embodiments includes similar motor, generator, and/or electric machine types.

Figure 2:
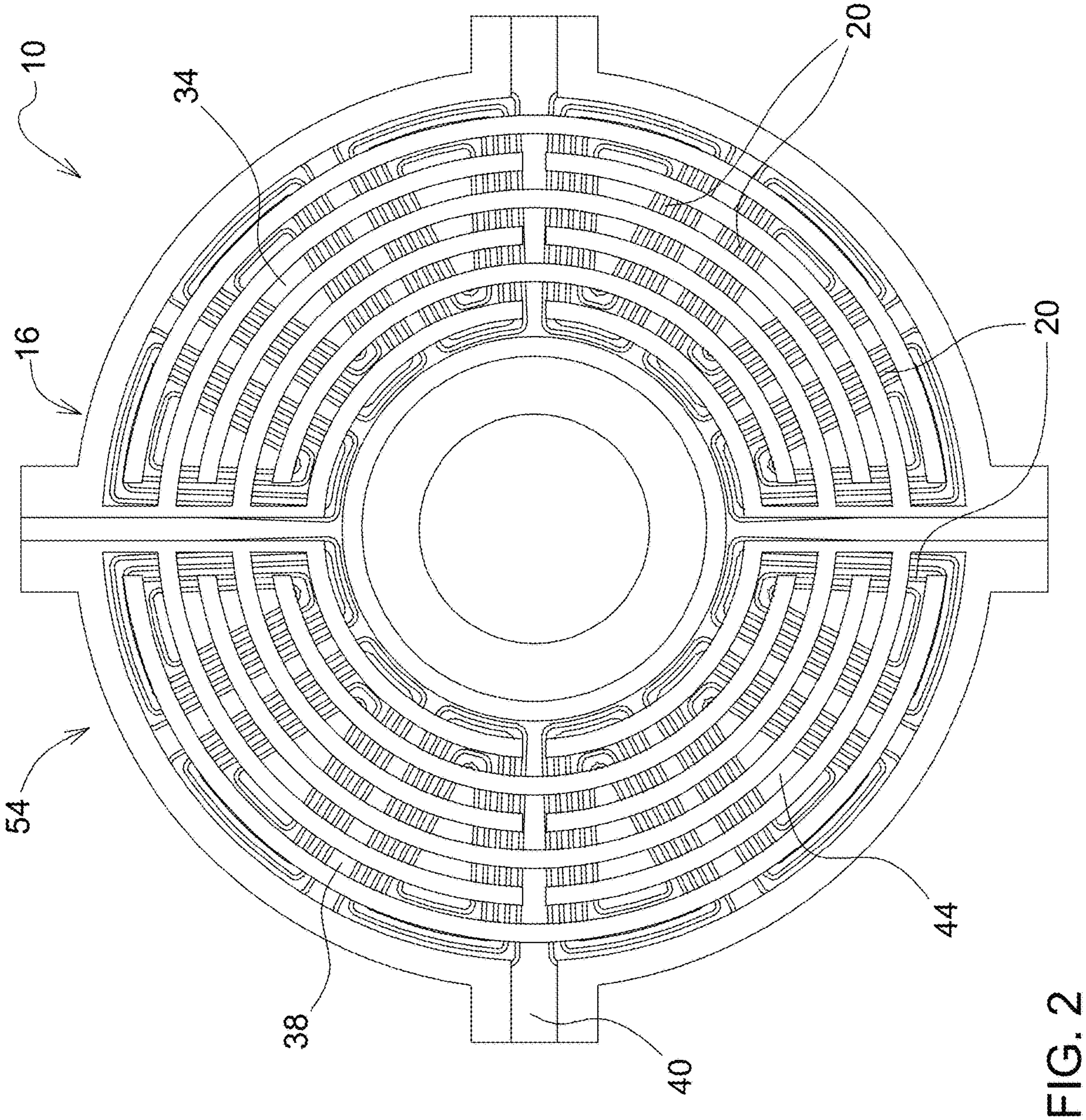
FIG. 2 is a cross-sectional view of an axial flux electric machine in accordance with an embodiment of the present disclosure.
Figure 3:
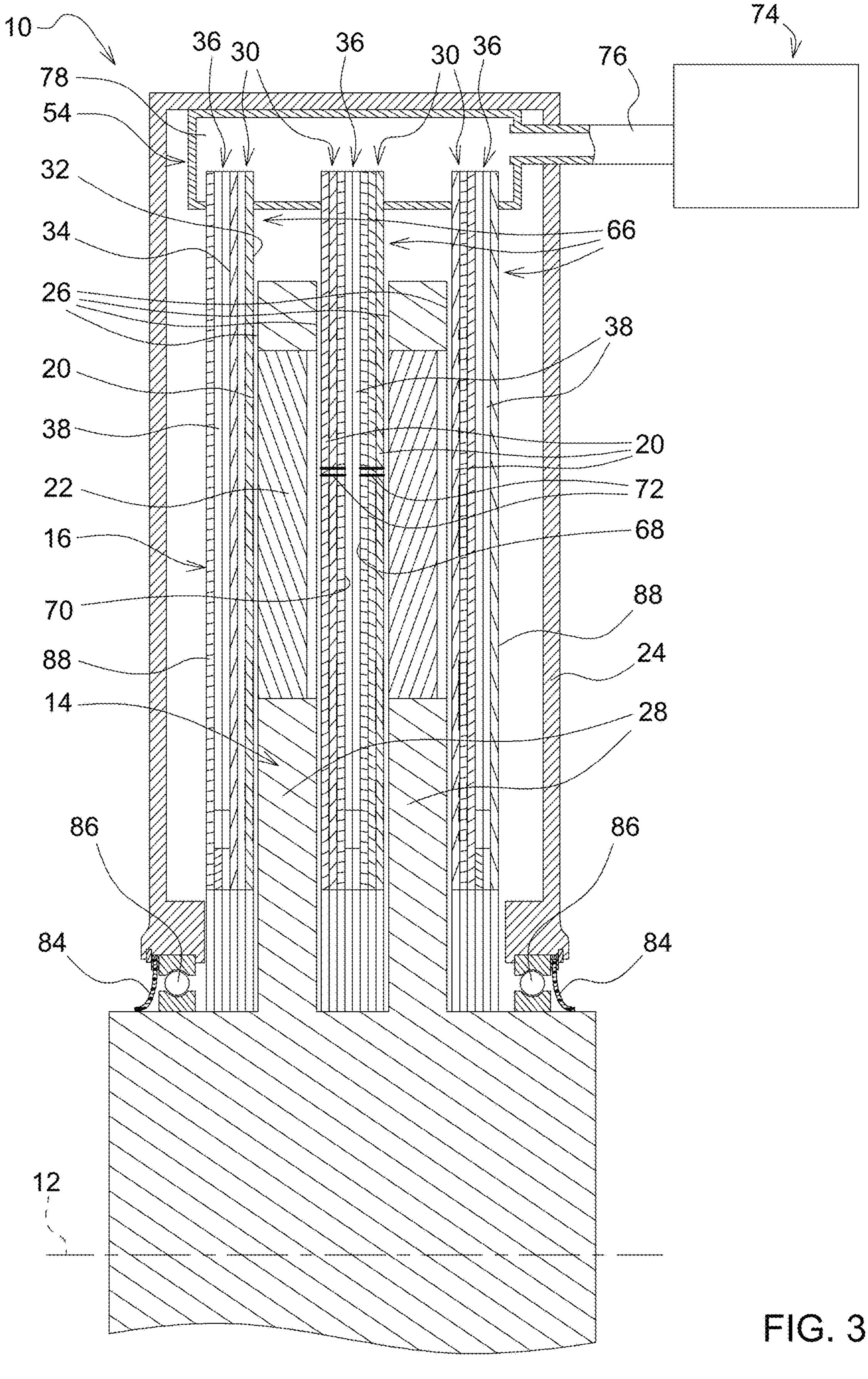
FIG. 3 is a partial cross-sectional view of an axial flux electric machine in accordance with an embodiment of the present disclosure.
Figure 4:
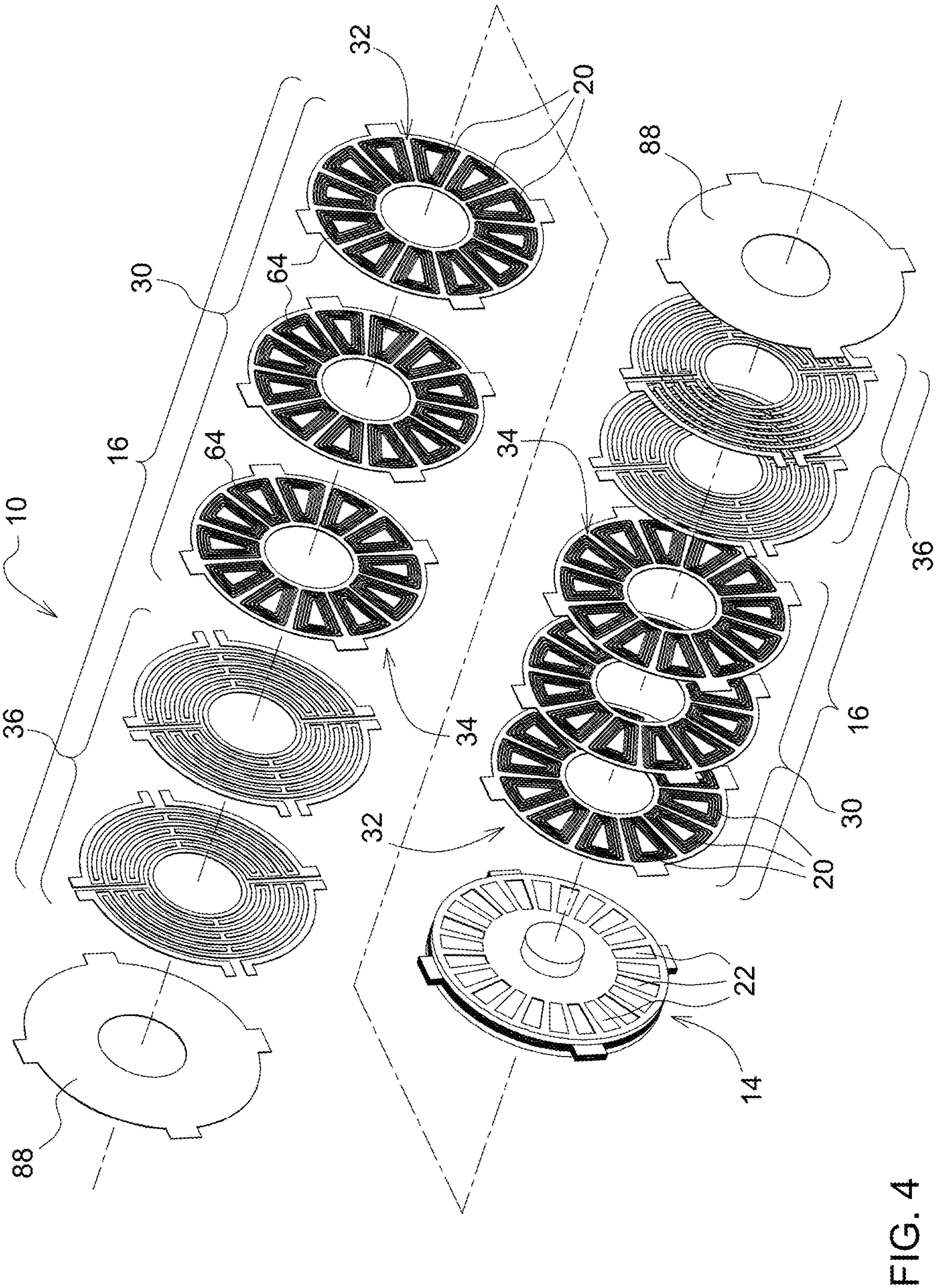
FIG. 4 is an exploded view of an axial flux electric machine in accordance with an embodiment of the present disclosure.

The electric machine 10 illustrated in FIGS. 1-4 includes a rotor 14 that rotates and a stator 16 that includes stator windings 20. The stator 16 is stationary and may surround, at least partially, the rotor 14. As illustrated in FIGS. 3 and 4, the rotor 14 includes a plurality of magnets 22 arranged in a circular pattern, arrangement, and/or array. The magnets 22 may be permanent magnets and/or electromagnets in one or more embodiments. One or more magnetic field(s) is/are generated by the magnets 22 and interact(s) with one or more magnetic field(s) produced by windings in the stator, which may result in the generation of torque that drives the rotation of the rotor 14 of the electric machine 10 in at least one embodiment.

As illustrated in FIG. 1, the electric machine 10 includes a housing 24, and as shown best in FIG. 3, the rotor 14 is rotatably mounted to the housing 24 for rotation relative to the housing 24. The stator 16 is fixed with the housing 24 and is axially spaced from the rotor 14 by an air gap 26 to allow rotation of the rotor 14 relative to the stator 16 and the housing 24. The rotor 14 includes one or more rotor disc(s) 28 includes the magnets 22 fixed to the rotor disc 28.

In the embodiment shown in FIG. 3, the rotor 14 includes multiple rotor discs 28. Each of the rotor discs 28 includes magnets 22 fixed to the rotor disc 28.

In the illustrated embodiments, the stator 16 includes multiple stator portions 66. Each stator portion 66 is axially spaced from one or more of the rotor discs 28 of the rotor 14 by the air gap 26 to allow rotation of the rotor 14 relative to the stator 16 and the housing 24. In additional embodiments, the stator 16 includes only one stator portion 66 or more than three stator portions 66.

The rotor 14 of one or more embodiments includes one or more rotor disc(s) 28 each having a separate group of magnets 22 fixed to each axial side of the rotor disc(s) 28 such that the stator portions 66 interact with each side/group of magnets 22 of the rotor disc(s) 28. Alternatively or additionally, in additional embodiments, one or more of the rotor disc(s) 28 includes a single group of magnets 22 that interacts at each axial side of the rotor disc 28 with the axially adjacent stator portion 66. In an embodiment of the present disclosure not illustrated, a single stator portion 66 has two rotor discs 28 positioned at axial ends of the single stator portion 66. In one or more embodiments, the magnets 22 are bonded or otherwise fixed to the axial surface of and/or embedded into or under the axial surface of the rotor disc(s) 28.

In accordance with embodiments best shown in FIGS. 2-4, the stator 16 includes a winding layer 30 extending radially in the housing 24 and includes a first winding layer side 32 and a second winding layer side 34 opposite from the first winding layer side 32. The air gap 26 is disposed at the first winding layer side 32 as shown in FIG. 3. The winding layer 30 further includes one or more winding(s) 20 supplying, carrying, or conducting electrical current. The winding layer 30 of an embodiment includes multiple winding layer laminations 64 stacked axially, and each winding layer 30 and/or winding layer lamination 64 includes the windings 20.

In an embodiment, the winding layer 30 includes or is a printed circuit board (PCB) having or otherwise supporting copper coils that form the windings 20. In an embodiment, each of the winding layer laminations 64 is a PCB having windings 20. The winding layer 30 of other embodiments may be formed from other structures or by other manufacturing methods.

The stator 16 of embodiments shown in FIGS. 1-3 further includes a fluid channel layer 36 extending radially in the housing 24. As shown in FIG. 3, the fluid channel layer 36 is disposed at the second winding layer side 34 opposite from the first winding layer side 32. The fluid channel layer 36 includes a fluid channel 38 circulating, conveying, or containing a fluid 40 against, through, and/or across the windings 20. In an embodiment, the fluid channel 38 circulates, conveys, or contains the fluid 40 to be in contact or direct contact with the windings 20. In an embodiment, the electrically conductive windings 20 directly contact the fluid 40 without any coating, layer, or other material being disposed between the windings 20 and the fluid 40. In alternative embodiments, an electrically insulating coating, layer, or other material forms part of the windings 20 such that the windings 20 are electrically insulated from the fluid 40 but directly contact the fluid 40. In such alternative embodiments, the coating, layer, or other material may be thermally conductive, such as aluminum nitride in a non-limiting example. In other embodiments not illustrated, the windings 20 include one or more coatings, layers, and/or other materials upon which the fluid 40 directly contacts the windings 20. The second winding layer side 34 of the fluid channel layer 36 forms an inner axial side of the fluid channel 38 of the fluid channel layer 36.

The fluid 40 in the illustrated embodiments is a dielectric oil or other fluid. In an additional embodiment of the present disclosure not illustrated, the fluid 40 includes a coolant, such as water ethylene glycol in a non-limiting example. The fluid 40 in additional embodiments not illustrated may include a liquid and/or gas coolant and/or other fluid.

As shown in FIG. 3, the housing 24 in one or more embodiments includes one or more seal(s) 84 to allow the fluid 40 and/or other fluids or material to be contained in the housing 24 and/or one or more bearing(s) 86 to allow the rotor 14 to freely rotate relative to the stator 16. In additional embodiments not illustrated, the housing 24 does not include one or more of the seal(s) 84, such as when the fluid 40 is completely contained within the stator 16. In additional embodiments not illustrated, the housing 24 does not include one or more of the bearing(s) 86 or includes the bearing(s) 86 at another location.

In an embodiment shown in FIG. 3, two winding layers 30 are formed on a stator portion 66 extending radially in the housing 24 and are disposed axially between two of the rotor discs 28 of the rotor 14. As best shown in FIG. 3, the fluid channel layer 36 is disposed between the two winding layers 30. In the embodiment, the second winding layer side 34 of each of the two winding layers 30 forms a first inner axial side 68 of the fluid channel 38 and a second inner axial side 70 of the fluid channel 38.

In one or more embodiments not illustrated, a fluid channel layer 36 extends axially between two winding layer laminations 64 such that winding layer laminations 64 are positioned on and directly against each axial side of the fluid channel layer 36 to allow the fluid 40 to directly contact the windings 20 of each of the two winding layer laminations 64.

As shown in FIGS. 2-4, the fluid channel layer 36 of an embodiment includes multiple fluid channel layer laminations stacked axially and cooperating to form the fluid channel 38 to circulate the fluid 40.

As shown in FIGS. 2 and 4, the fluid channel 38 of an embodiment includes a serpentine path 44 circulating, conveying, or containing the fluid 40 radially and/or circumferentially through the fluid channel 38. In additional embodiments, the fluid channel 38 may include or be formed as a different structural or functional path and/or may circulate in a direction that is different from the serpentine path 44.

In the embodiment illustrated in FIG. 4, the stator 16 of the electric machine 10 includes one or more end plate lamination(s) 88 that form an axial end of the stator 16, the fluid channel 38, and/or an axial end of the fluid channel layer 36.

The fluid channel 38 of the embodiment shown in FIG. 1 includes one or more inlet(s) 46 circulating or conveying the fluid 40 into the fluid channel 38 at an inlet location 48 of the fluid channel layer 36. The fluid channel 38 of the embodiment further includes one or more outlet(s) 50 circulating or conveying the fluid 40 out of the fluid channel 38 at an outlet location 52 of the fluid channel layer 36 that is circumferentially spaced from the inlet location 48 at a radially outer edge 54 of the fluid channel layer 36. The inlet location 48 of an embodiment is circumferentially spaced from the outlet location 52 by an angle greater than zero degrees and less than 180 degrees. The inlet location 48 may be circumferentially spaced from the outlet location 52 by an angle between 5 degrees and 175 degrees, between 10 and 170 degrees, between 30 and 150 degrees, between 45 and 135 degrees, or about or substantially 90 degrees in additional embodiments. The fluid channel 38 of the embodiment illustrated in FIG. 1 includes two inlets 46 circulating or conveying the fluid 40 into the fluid channel 38 at a first inlet location 56 of the fluid channel layer 36 and a second inlet location 58 of the fluid channel layer 36 and two outlets 50 circulating or conveying the fluid 40 out of the fluid channel 38 at a first outlet location 60 at the fluid channel layer 36 and a second outlet location 62 of the fluid channel layer 36. Each of the first inlet location 56, the second inlet location 58, the first outlet location 60, and the second outlet location 62 are circumferentially spaced at the radially outer edge 54 of the fluid channel layer 36. In an embodiment, the first inlet location 56, the second inlet location 58, the first outlet location 60, and the second outlet location 62 are evenly and circumferentially spaced at the radially outer edge 54 of the fluid channel layer 36.

In additional embodiments, such as that shown in FIG. 3, the fluid channel 38 may include a portion 72 directed toward the rotor 14 to allow all or a portion of the fluid 40 to be sprayed or otherwise convey or circulated on or to the magnets 22 or another portion of the rotor 14. If such a design feature is utilized, the machine 10 may further include a fluid sump and/or a separate pump (not shown) to circulate the fluid 40 within the fluid system 74.

In additional embodiments not illustrated, the fluid channel layer 36 may be included in the rotor 14, such as through a rotor shaft and/or axially between magnets 22 in one or more rotor disc(s) 28, instead of or in addition to the fluid channel layer 36 being located in or with the stator 16 as described herein. In such an embodiment, the fluid 40 would be similarly circulated or conveyed through the rotor 14 to cool the magnets 22 and/or the rotor disc(s) 28. In a further embodiment not illustrated, the fluid channel layer 36 may be included in the housing 24, such as at the axial end(s) of the housing 24, instead of or in addition to the fluid channel layer 36 being located in or with the stator 16 as described herein.

The electric machine 10 of the embodiment illustrated in FIG. 1 includes a fluid system 74 having a fluid supply line 76 sending the fluid 40 to the inlet(s) 46 via a fluid inlet manifold 78. The fluid system 74 of the electric machine 10 of the embodiment further includes a fluid return line 80 receiving the fluid 40 from the outlet(s) 50 via a fluid outlet manifold 82. The fluid system 74 may further include one or more pumps, compressors, heat exchangers, reservoirs, filters, valves, or other fluid components.

The fluid system 74 of the embodiment illustrated in FIG. 1 is located partially outside of the housing 24 but may be located completely inside of the housing 24 or include some components, such as the manifolds 78, 82, located outside of the housing 24 in other embodiments.

A method of circulating the fluid 40 through the fluid channel layer 36 is further disclosed in accordance with embodiments of the present disclosure. The method of various embodiments includes circulating the fluid 40 against, across, through, or otherwise to be in contact with or direct contact with the windings 20. The embodiments of the method include any one or more steps or functions performed by any elements of the embodiments described in the present disclosure.

Without in any way limiting the scope, interpretation, or application of the claims appearing below, a technical effect of one or more of the example embodiments disclosed herein is to improve the efficiency and performance of the electric machine 10 and the associated methods. In particular, in conventional axial flux electric machines, the rotor, stator, and/or other portions of the machine may be cooled with fluid being circulated through the air gap 26, such as with a forced oil flow. The electric machine 10 and associated methods described herein avoid windage, which may be caused in conventional designs by oil or other fluid passing through the thin air gap 26 and causing fluid shearing loss. Avoiding such windage improves efficiency and performance by circulating the fluid 40 in the manner and at the locations described according to the various embodiments described herein.

In the embodiments described herein, the winding layer 30 and/or the individual winding layer lamination(s) 64, including any individual PCBs of such layer 30 or laminations 64, form, at least partially, the path through which the fluid 40 flows to more effectively cool or otherwise control the temperature of the winding layer 30 and any other portions of the stator 16 and the rotor 14. In an embodiment, the winding layer 30 and/or the lamination(s) 64 are structured such that the fluid 40 is able to cool or otherwise transfer heat directly with the windings 20 and/or the winding layer lamination(s) 64, including at locations of the windings 20 and/or the winding layer lamination(s) 64 that experience the highest temperatures during operation of the electric machine 10.

The embodiments of the electric machine 10 described herein further improve flexibility for applications of the electric machine 10 at least due to the elimination of a conventional fluid sump and/or not relying on gravity return of the fluid 40. Such characteristics allow the electric machine 10 to be orientated and/or located in unlevel positions and/or within smaller and/or geometrically challenging space constraints, such as in a wheel motor for a battery electric or hybrid vehicle application or similar vehicle applications in non-limiting examples.

Any one or more features, structures, and/or functions of any embodiment(s) of the electric machine 10 described or shown herein may be added to or combined with one or more other embodiment(s) of the electric machine 10 described or shown herein, or omitted from such embodiment(s), to form one or more additional embodiment(s) of the electric machine 10 or related methods in accordance with the present disclosure. Additionally, any one or more steps, processes, and/or methods of any embodiment(s) of the electric machine 10 described or shown herein may be added to or combined with one or more other embodiment(s) of the electric machine 10 described or shown herein, or omitted from such embodiment(s), to form one or more additional embodiment(s) of the electric machine 10 or related methods in accordance with the present disclosure.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. An axial flux electric machine comprising:

a housing;

a rotor rotatably mounted to the housing for rotation relative to the housing, the rotor comprising a rotor disc comprising a plurality of magnets fixed to the rotor disc; and a stator fixed with the housing and axially spaced from the rotor by an air gap to allow rotation of the rotor relative to the stator and the housing;

wherein the stator comprises:

a winding layer extending radially in the housing and comprising a first winding layer side and a second winding layer side opposite from the first winding layer side such that the air gap is disposed at the first winding layer side, the winding layer further comprising a plurality of windings configured to carry electrical current; and a fluid channel layer extending radially in the housing and being disposed at the second winding layer side opposite from the first winding layer side, and comprising a fluid channel configured to circulate a fluid against the plurality of windings, and comprising a plurality of fluid channel layer laminations stacked axially and cooperating to form the fluid channel.

2. The axial flux electric machine of claim 1, wherein the second winding layer side of the fluid channel layer forms an inner axial side of the fluid channel of the fluid channel layer.

3. The axial flux electric machine of claim 1, wherein the fluid channel comprises a serpentine path configured to circulate the fluid at least one of radially and circumferentially through the fluid channel.

4. The axial flux electric machine of claim 1, wherein the fluid channel comprises at least one inlet configured to circulate the fluid into the fluid channel at an inlet location of the fluid channel layer and at least one outlet configured to circulate the fluid out of the fluid channel at an outlet location of the fluid channel layer that is circumferentially spaced from the inlet location at a radially outer edge of the fluid channel layer.

5. The axial flux electric machine of claim 4, wherein the inlet location is circumferentially spaced from the outlet location by an angle greater than zero degrees and less than 180 degrees.

6. The axial flux electric machine of claim 1, wherein the fluid channel comprises two inlets configured to circulate the fluid into the fluid channel at a first inlet location of the fluid channel layer and a second inlet location of the fluid channel layer and two outlets configured to circulate the fluid out of the fluid channel at a first outlet location at the fluid channel layer and a second outlet location of the fluid channel layer, wherein each of the first inlet location, second inlet location, first outlet location, and second outlet location are circumferentially spaced at a radially outer edge of the fluid channel layer.

7. The axial flux electric machine of claim 6, wherein the first inlet location, the second inlet location, the first outlet location, and the second outlet location are evenly and circumferentially spaced at the radially outer edge of the fluid channel layer.

8. The axial flux electric machine of claim 1, wherein the winding layer comprises a plurality of winding layer laminations stacked axially and each comprising the plurality of windings.

9. An axial flux electric machine comprising:

a housing;

a rotor rotatably mounted to the housing for rotation relative to the housing, the rotor comprising a plurality of rotor discs, each of the plurality of rotor discs comprising a plurality of magnets fixed to the rotor disc; and a stator fixed with the housing and comprising a plurality of stator portions, each of the plurality of stator portions axially spaced from at least one of the plurality of rotor discs of the rotor by an air gap to allow rotation of the rotor relative to the stator and the housing;

wherein at least one of the plurality of stator portions comprises:

at least one winding layer extending radially in the housing and comprising a first winding layer side and a second winding layer side opposite from the first winding layer side such that the air gap is disposed at the first winding layer side, the winding layer further comprising a plurality of windings configured to carry electrical current; and a fluid channel layer extending radially in the housing and being disposed at the second winding layer side opposite from the first winding layer side, comprising a fluid channel configured to circulate a fluid against the plurality of windings, and comprising a plurality of fluid channel layer laminations stacked axially and cooperating to form the fluid channel.

10. The axial flux electric machine of claim 9, wherein the at least one winding layer comprises two winding layers extending radially in the housing and disposed axially between two of the plurality of rotor discs of the rotor with the fluid channel layer disposed between the two winding layers.

11. The axial flux electric machine of claim 10, wherein the second winding layer side of each of the two winding layers forms a first inner axial side of the fluid channel and a second inner axial side of the fluid channel.

12. The axial flux electric machine of claim 9, wherein the second winding layer side of the fluid channel layer forms an inner axial side of the fluid channel.

13. The axial flux electric machine of claim 9, wherein the fluid channel comprises a serpentine path configured to circulate the fluid at least one of radially and circumferentially through the fluid channel.

14. The axial flux electric machine of claim 9, wherein the fluid channel comprises at least one inlet configured to circulate the fluid into the fluid channel at an inlet location of the fluid channel layer and at least one outlet configured to circulate the fluid out of the fluid channel at an outlet location of the fluid channel layer that is circumferentially spaced from the inlet location at a radially outer edge of the fluid channel layer.

15. The axial flux electric machine of claim 14, wherein the inlet location is circumferentially spaced from the outlet location by an angle greater than zero degrees and less than 180 degrees.

16. The axial flux electric machine of claim 9, wherein the fluid channel comprises two inlets configured to circulate the fluid into the fluid channel at a first inlet location of the fluid channel layer and a second inlet location of the fluid channel layer and two outlets configured to circulate the fluid out of the fluid channel at a first outlet location at the fluid channel layer and a second outlet location of the fluid channel layer, wherein each of the first inlet location, second inlet location, first outlet location, and second outlet location are circumferentially spaced at a radially outer edge of the fluid channel layer.

17. The axial flux electric machine of claim 16, wherein the first inlet location, the second inlet location, the first outlet location, and the second outlet location are evenly and circumferentially spaced at the radially outer edge of the fluid channel layer.

18. The axial flux electric machine of claim 9, wherein the winding layer comprises a plurality of winding layer laminations stacked axially and each comprising the plurality of windings.

* * * * *